United States Patent
Wünscher et al.

(10) Patent No.: US 6,540,062 B2
(45) Date of Patent: Apr. 1, 2003

(54) METHOD FOR CONTROLLING ITEMS BELONGING TO A COMMISSIONING ORDER AND A DEVICE FOR CARRYING OUT SAID METHOD

(75) Inventors: Eduard Wünscher, Hart bei Graz (AT); Karl Freudelsperger, Hart bei Graz (AT)

(73) Assignee: Knapp Logistik Automation GmbH, Hart bei Graz (AT)

( * ) Notice: Subject to any disclaimer, the term of this patent is extended or adjusted under 35 U.S.C. 154(b) by 0 days.

(21) Appl. No.: 09/403,171
(22) PCT Filed: Apr. 16, 1998
(86) PCT No.: PCT/AT98/00098
§ 371 (c)(1), (2), (4) Date: Oct. 18, 1999
(87) PCT Pub. No.: WO98/47790
PCT Pub. Date: Oct. 29, 1998

(65) Prior Publication Data
US 2002/0063036 A1 May 30, 2002

(30) Foreign Application Priority Data
Apr. 17, 1997 (AT) .................................................. 663/97

(51) Int. Cl.[7] .............................................. B65G 1/137
(52) U.S. Cl. .................................... 198/395; 250/223 R
(58) Field of Search ........................... 198/395; 250/271, 250/223 R, 223 B

(56) References Cited

U.S. PATENT DOCUMENTS

| | | | | |
|---|---|---|---|---|
| 3,734,311 A | * | 5/1973 | Thompson et al. | 214/152 |
| 3,881,605 A | * | 5/1975 | Grossman | 198/33 R |
| 3,949,194 A | * | 4/1976 | Catto et al. | 198/160 |
| 4,228,886 A | * | 10/1980 | Moran | 198/395 |
| 4,280,136 A | * | 7/1981 | Kasima et al. | 358/93 |
| 4,360,274 A | * | 11/1982 | Norton-Wayne | 356/394 |
| 4,404,684 A | * | 9/1983 | Takada | 382/25 |
| 4,608,646 A | * | 8/1986 | Goodrich et al. | 198/391 |
| 4,819,783 A | * | 4/1989 | Pinyan et al. | 198/395 |
| 4,819,784 A | * | 4/1989 | Sticht | 198/395 |
| 4,825,068 A | * | 4/1989 | Suzuki et al. | 250/223 |
| 4,875,776 A | * | 10/1989 | Pryor | 356/372 |
| 5,114,230 A | * | 5/1992 | Pryor | 356/372 |
| 5,143,224 A | * | 9/1992 | Burchall | 209/579 |
| 5,183,144 A | * | 2/1993 | Francioni | 198/395 |
| 5,201,397 A | * | 4/1993 | Isaacs | 198/395 |
| 5,280,170 A | * | 1/1994 | Baldwin | 250/223 |
| 5,314,055 A | * | 5/1994 | Gordon | 198/395 |
| 5,406,770 A | | 4/1995 | Fikacek | |
| 5,434,428 A | * | 7/1995 | Paladini | 250/559.24 |
| 5,451,795 A | * | 9/1995 | Carbrey et al. | 250/556.29 |
| 5,462,176 A | * | 10/1995 | Hereford et al. | 209/577 |
| 5,495,097 A | * | 2/1996 | Katz et al. | 235/462 |
| 5,525,786 A | * | 6/1996 | Dumont | 235/462 |
| 5,620,061 A | * | 4/1997 | Fraser | 186/68 |
| 5,924,546 A | * | 7/1999 | Funaya | 198/395 |
| 6,046,462 A | * | 4/2000 | Yokajty et al. | 250/559.08 |
| 6,056,108 A | * | 5/2000 | Buchi et al. | 198/395 |
| 6,137,900 A | * | 10/2000 | Steidel et al. | 382/142 |

FOREIGN PATENT DOCUMENTS

| | | |
|---|---|---|
| DE | 23 40 209 A | 2/1975 |
| EP | 0 572 830 A | 12/1993 |
| EP | 0 645 322 A | 3/1995 |
| WO | WO 85 02282 | 5/1985 |

* cited by examiner

Primary Examiner—Douglas Hess
(74) Attorney, Agent, or Firm—Sughrue Mion, PLLC

(57) ABSTRACT

Disclosed are a method and an arrangement for checking items (3) belonging to a commissioning order and transported on a conveyor path (1) with respect to product type and number of items (3) by aid of sensing devices (10) connected with a computer (4'). Here, each one of the items (3) is optically or opto-electronically, respectively, checked, optionally after having been individualized and aligned, while being transported.

12 Claims, 3 Drawing Sheets

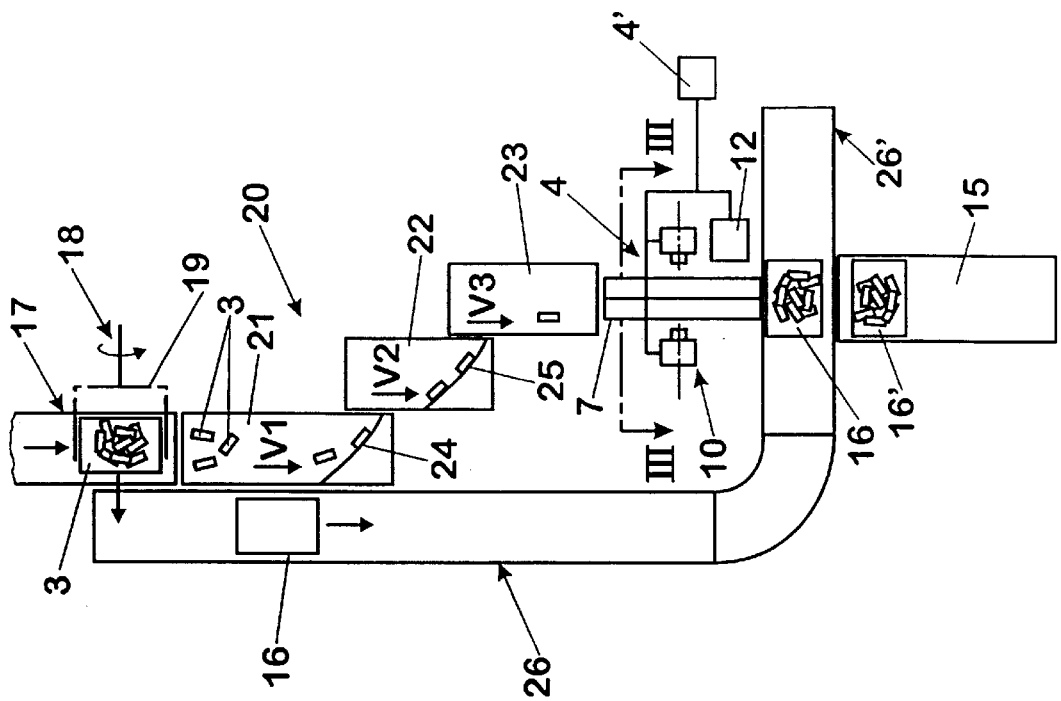
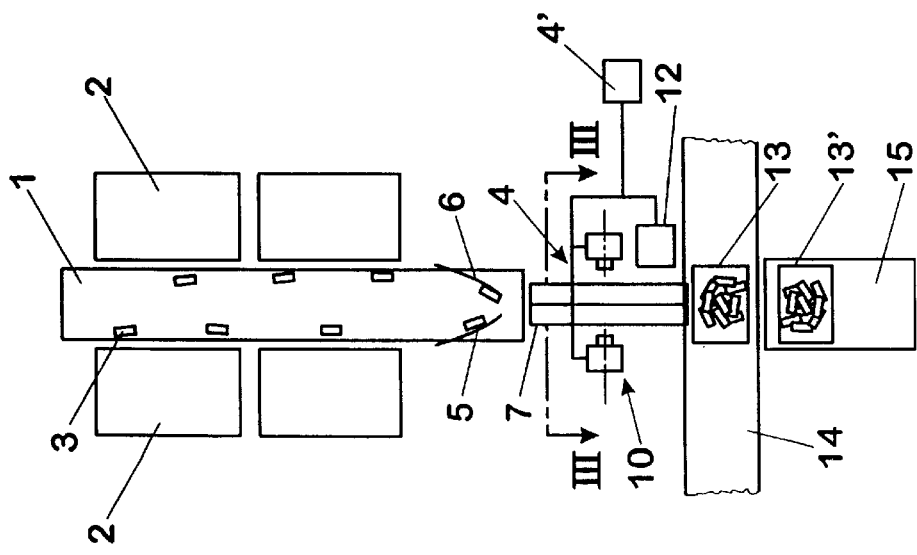

METHOD FOR CONTROLLING ITEMS BELONGING TO A COMMISSIONING ORDER AND A DEVICE FOR CARRYING OUT SAID METHOD

This is a National Stage entry under 35 U.S.C. §371 of application No. PCT/AT98/00098 filed Apr. 16, 1998, and the complete disclosure of which is incorporated into this application by reference.

BACKGROUND OF THE INVENTION

The invention relates to a method for checking items belonging to a commissioning order and transported on a conveyor path with respect to product type and number of items by aid of sensing devices connected with a computer.

Moreover, the invention relates to an arrangement for carrying out the method.

At present, in large warehouses, items are arranged manually, semiautomatically or automatically to groups of goods according to commissioning orders and collected in containers. For checking purposes, the containers are guided to weighing devices in the dispatching region so as to compare the net weight of the container contents with the sum of the individual weights of the items. Since in many instances, particularly in the pharmaceutical whole sale business, products weighing less than 10 g are in circulation, checks may often yield incorrect results. A check for the type of product by such a weighing procedure is hardly possible and also difficult, respectively, since many different products have approximately the same weight. Thus, there is a demand for a control which enables a safe check for the type of product and the number of products.

From DE 691 10 852 D2 a method is known for the commissioning of items which are removed from the compartments of shelves by commissioners by hand, are identified by means of a bar code reading device, weighed, and subsequently dropped into an empty or already partially filled container. The containers are transported on a main conveyor path so as to be shifted onto one or several secondary conveyor paths which consist of non-driven rollers; adjacent each secondary conveyor path, a manually displaceable checking device is arranged in which identification and weighing of the items are effected by the commissioner. The containers arriving at the checking device are also identified by means of a bar code reading device, and all the data sensed are monitored by a central computer so as to monitor correspondence of the items commissioned in the containers with the commissioning order; at each checking device, a screen with a keyboard is additionally provided for interactive communication of the commissioner with the central computer. This method thus provides for a check of the items during the commissioning procedure itself, the mode of procedure being comparatively complex and still uncertain.

In EP 572 830 B1 a method of identifying, labelling and targeting of goods at the input of goods and/or at the output of goods in a warehouse is described. By "goods", cartons of equal or different sizes containing items are to be understood. These cartons pass a checking station in which a plausibility check takes place, namely whether or not the previously effected identification, weight and volume are in agreement. For identification purposes, a reading device is provided which preferably also consists of six scanners to scan the cartons on all sides or to read the information printed on a label; the read actual data are transmitted to a computer for a comparison with the set data. In this method, however, checking of the items themselves which are contained in the cartons does not take place so that there, too, the disadvantages explained above prevail.

SUMMARY OF THE INVENTION

It is thus the object of the invention to provide a method of the initially defined kind as well as an arrangement for carrying out the method by which a precise, in particular automatic, checking of the individual items is carried out while they are being commissioned so as to safely locate faulty groups of goods which do not exactly correspond to a commissioning order.

According to the invention, this object is achieved in the present method in that each item as such is optically or opto-electronically checked while being transported. Due to the fact that the individual items are each separately optically or opto-electronically detected and recognized, this method allows for a safe checking of the items, and advantageously it can be employed not only in new commissioning installations but also in already existing ones so as to completely exclude faulty deliveries, which is of particular importance in case of pharmaceutical products.

With a view to a rapid, automatic and safe checking, it is advantageous if the items are individualized prior to their being checked. Thereby the items can be scanned or "read", respectively, one after the other.

In this connection it is also advantageous if the items are aligned prior to checking; they may thus be brought into a certain longitudinal or transverse orientation which, although preferred—need not necessarily be done since there exist multidirectional electronic scanners, e.g., which can also detect the bar code of non-longitudinally aligned items.

If the items have already been commissioned into containers, according to the invention it is of particular advantage for the checking if the items which have been assembled in a container according to a commissioning order are removed from the container before each of them is checked. Prior to such a check, the items may be individualized and aligned, respectively, as mentioned above. Such a mode of procedure allows groups of items to be put together in the usual manner according to the respective commissioning orders and still to be safely checked automatically as desired for any mistakes which may have occurred during commissioning.

With comparatively poorly identifyable imprints on the items it has also proven advantageous if the items are temporarily stopped while being checked.

Furthermore, it is suitable if the items, in case of a negative result of the check, subsequently are corrected respectively in terms of type and number of products. Subsequently, the item groups initially found to be incorrect can be delivered immediately so as to comply with the commissioning order without having to start commissioning anew.

Moreover, it is advantageous if the items of a negative check result can be removed automatically thus obviating a time-consuming later, in particular manual, search for the faulty items.

For the rational course of commissioning also during checking it has furthermore proven advantageous if the items are transferred into a container after having been checked. In this manner, the items which have yielded a positive checking result can be passed on immediately as a complete group of goods, e.g. for packing and delivery thereof. To reduce the number of containers which are in circulation, it is also suitable if, after checking, the items are transferred into that container which originally contained them.

To effectively shorten the checking procedure, it is particularly advantageous if several items are checked simultaneously.

In an arrangement for carrying out the method, it is provided that the conveyor path comprises a checking station with automatically operating optical or opto-electronical, respectively, sensing devices associated therewith or arranged to follow the former. By this arrangement, minimal time is required as compared with checking carried out by hand, whereby not only the working time as such with the costs associated therewith can be saved, but also commissioning orders can be completed even more rapidly—and with certainty.

Advantageously it can also be provided that a container-emptying station is associated with the conveyor path and that therebehind an aligning and individualizing station is arranged which is followed by the checking station. By this arrangement, the items can be suitably prepared for the checking procedure proper by being individualized and longitudinally aligned so that misreadings by the sensing devices are excluded. Checking of the individual items themselves on the other hand gives a practically 100% certainty of the check for the correctness of the assembled groups of goods.

A preferred, advantageous embodiment consists in that the checking station comprises a chute formed at least partially of transparent material, at which the optical or opto-electronical sensing devices are arranged transversely to its longitudinal direction. On the chute which is downwardly inclined by e.g. 30°, the items move past the sensing devices without requiring a separate drive, e.g. a vibration drive, or a separately driven conveyor path therefor whose structure might constitute an optical impediment to the recognition procedure.

A particularly advantageous embodiment provides for the chute to have a V-shaped cross-section. In this case it is suitable if the legs of the chute enclose an angle of 90° with each other. In this manner, the items come to lie snugly with two of their longitudinal side faces on the two legs of the V-shaped chute, resulting in ideal conditions for an optical identification.

Advantageously it can also be provided for the checking station to be formed by a path of small rollers. Between adjacent rollers, also the lower side of the items can be checked, while the upper side and the longitudinal side of the items are freely accessible to begin with. If the path of small rollers is arranged to be inclined, this variant does not require an additional drive either.

In terms of complete automation, it is furthermore particularly advantageous if the checking station is followed by a device for automatically removing the items.

In tests, it has proven particularly suitable if as the sensing devices, at least two, preferably four, scanners or video cameras are arranged opposite each other. In this manner, imprints or codes on the items or even their entire appearance can be compared with stored comparative information so as to determine the correctness of the items in a simple and absolutely certain manner. It has proven suitable if four scanners or video cameras are arranged opposite each other in pairs.

If due to poorly identifyable imprints on the items misreadings could occur while they are being moved, it is suitable if a stopping device for the items is arranged in the region of the sensing devices. In this case it is particularly advantageous if the stopping device comprises a solenoid. To stop the items, the solenoid need only be operated for a short time resulting in practically no delay of the passage of the items.

According to a preferred embodiment of the invention it is provided for the aligning and individualizing station to be formed by several, e.g. laterally offset conveyor paths conveying the items at different speeds. This arrangement in practice has yielded very good results, individualizing and aligning of the items being effected in a relatively short period of time. For an alignment of the items while they are being individualized, it is also advantageous if the first conveyor path(s) is (are) provided with directing plates for directing the items to the (respective) consecutive conveyor path. With a view to individualizing, it is suitable if the conveying speeds increase from one respective conveyor path to the next conveyor path.

The invention will be further explained by way of preferred exemplary embodiments to which, however, it shall not be restricted, and with reference to the drawings.

BRIEF DESCRIPTION OF THE DRAWINGS

FIGS. 1 and 2 each show a schematic top view onto an arrangement for carrying out the method according to the invention;

In FIG. 1, a conveyor path is denoted by 1, which moves items 3 dispensed individually and consecutively by an automat 2 according to a commissioning order to a checking station 4 in which the items 3 are checked in terms of product type and number. Before the items 3 reach the checking station 4, they are directed to the middle of the conveyor path 1 by directing plates 5, 6 so as to fall on a chute 7 which is inclined downwardly in transportation direction by 30°, the chute having a V-shaped cross-section, as is visible in FIG. 3. The directing plates 5, 6 may be omitted if the chute 7 and the conveyor path 1 have equal widths.

Figure 3:
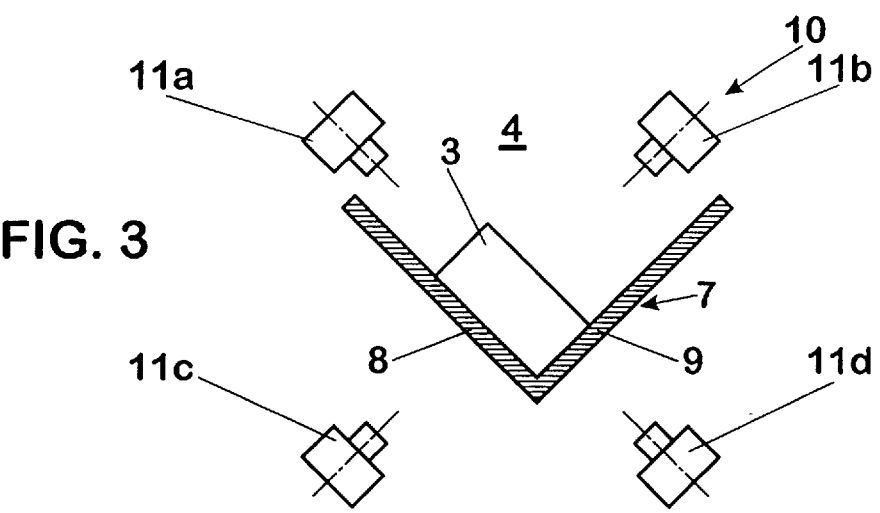
FIG. 3 shows a part of the arrangement according to FIG. 1 in front view, partially in cross-section, according to line III—III of FIG. 1 or FIG. 2, respectively.

The chute 7 is at least partially comprised of a transparent material, preferably glas or transparent plastics, and its legs 8, 9 enclose an angle of 90° so that two longitudinal side faces of the cuboid items 3 can lie snugly thereon. Approximately in the longitudinal middle of the chute 7, sensing devices 10, e.g. four scanners, in particular bar code scanners, e.g. multidirectional bar code scanners, which can also sense transversely arranged bar codes, are arranged transversely to the longitudinal direction of the chute, or four video cameras 11a to 11b (cf. also FIG. 3), whose optical axes are oriented perpendicularly to the legs 8, 9 or to the four longitudinal side faces of the items 3, respectively. In this manner, either a bar code, a mark, an inscript, a figure on the longitudinal side faces and/or the contour of the items 3 can be detected optically and transformed into electric signals which are transmitted to a computer 4'. In this connection it may be provided that always only one of the items 3 is sensed—from certain sides or from all sides—, however, if the video cameras 11 or the scanning devices (e.g. several scanning devices adjacently arranged on one level) are suitable therefor, also simultaneous seinsing of several items can be carried out; what is essential is that each one of the items 3 is sensed. By aid of a bar code or sign or picture recognition program stored in the computer 4', which optionally is also suitable for simultaneously recognizing several items, both the product type and the number of items 3 can be checked thereby and compared with a commissioning order. The result may be displayed for the operating personnel on a screen 12 arranged in the region of the chute 7.

From the chute 7, the items 3 drop into a container 13 which is transported on a conveyor path 14 and stopped at the chute 7.

If the computer 4-determined result of the check regarding the type of product and number of items 3 is in agreement with the commissioning order, the container 13 is passed on via the conveyor path 14 to a delivery or packing station (not illustrated). If there is no agreement, the container 13' is transferred outwardly to an area of deposit 15, and the operating personnel can correct the contents of the container 13' on the basis of the data displayed on the screen 12 and optionally transmit the correction effected to the computer via a keyboard (not illustrated).

In the exemplary embodiment illustrated in FIG. 2, the containers 16 filled with items 3 according to a commissioning order reach a container-emptying station 18 via a conveyor path 17, e.g. a roller conveyor path or a conveyor belt, at which the containers 16 are stopped and are tilted either manually or, preferably, automatically, e.g. via a tilting ledge or by aid of gripping means etc. (not illustrated in detail), generally by means of a tilting device 19, to empty their contents, i.e. the items 3, onto a conveyor path of an aligning and individualizing station 20. The tilting device 19 illustrated in dot-and-dash lines lifts the respective container 16, e.g. at the rear bottom edge, and tilts it over the front bottom edge; the tilting device 19 may also lift the container 16 at its collar, transport it to the consecutive aligning and individualizing station 20 and tilt it there.

In the example illustrated, the aligning and individualizing station 20 consists of three laterally offset conveyor paths 21, 22 and 23, their conveying speeds V1, V2, V3 increasing from the foremost conveyor path 21 onto which the items 3 are emptied from the containers 16 up to the last conveyor path 23, the items 3 at the end of the foremost and middle conveyor paths 21, 22 each being detoured by directing plates 24, 25 to the consecutive conveyor path 22, 23. Preferably, the second conveying speed V2 is twice as high as the first conveying speed V1, and is the third conveying speed V3 in turn twice as high as the second conveying speed V2. By this, a rapid longitudinal alignment of the items in the manner of an "entrainment" and individualization of the items 3 can be achieved.

It is, of course, also possible to carry out individualization of the items 3 on conveyor paths which are consecutively aligned in one line and each have a higher conveying speed, wherein optionally also funnel-like arranged directing plates may help in the individualizing procedure.

Alignment and individualizing of the items 3 in the aligning and individualizing station 20 could furthermore be effected manually, particularly on a relatively slowly moving conveyor path (not illustrated); it may also be completely omitted, if respective sensing devices 10 are provided which are able to sense several items in random positions on the basis of their contours as well as imprints; in this instance, the sensing devices 10 must have the entire width of the conveyor path in their "field of vision".

According to FIG. 2, the aligning and individualizing station 20 again is followed by the checking station 4 including the sensing devices 10 whose construction and mode of function have already been described before by way of FIGS. 1 and 3, thus obviating any further description.

From the chute 7 of the checking station 4, the items 3 again drop into the container 16 which in the meantime has been manually or, preferably, automatically taken from the emptying station 18 and put onto the conveyor path 26, and moved to the chute 7, e.g. by means of the tilting device 19 correspondingly designed for transverse displacement, or by a separate transverse displacement device, e.g. with a pneumatically actuated slide (not illustrated), and has been stopped at the chute 7. (A tilting device 19 which could be employed here is, e.g., the one according to DE 30 45 145 A1).

If the computer 4'-determined result of the check regarding the type of product and number of items 3 is in agreement with the commissioning order, the container 16 with the items 3 is then passed on via a conveyor path 26' to a delivery or packing station, respectively (not illustrated). If there is no agreement, the container 16' is again transferred outwardly to an area of deposit 15, and the operating personnel may again correct the contents of the container 16' on the basis of the data indicated on the screen 12 and optionally transmit the correction effected to the computer 4' via a keyboard (not illustrated).

Figure 4:
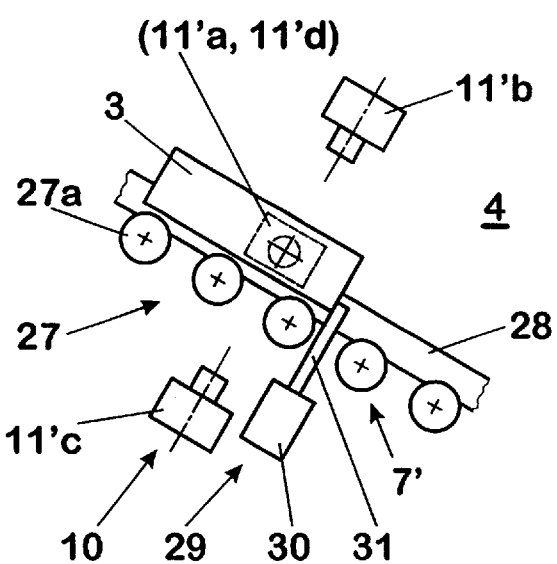
FIG. 4 shows a part of a further arrangement in side view.

FIG. 4 illustrates a variant of a checking station 4 comprising a modified "chute" 7' in the form of an inclined path 27 of small rollers. The sensing devices 10 comprise two oppositely arranged (bar code) scanners or video cameras 11'b, 11'c with optical axes extending between two of the small rollers 27a of the path 27 of small rollers. Moreover, two scanners or video cameras 11'a, 11'd having horizontal optical axes may be provided, as has been indicated in FIG. 4 in broken lines. It should be mentioned here that also in the exemplary embodiment according to FIG. 3, only two (or three) bar code scanners or video cameras could be employed instead of four bar code scanners or video cameras 11a–11d.

Laterally of the path 27 of small rollers and for guiding the items 3 longitudinally, according to FIG. 4 directing plates 28 are arranged, preferably of transparent material. To allow for an exact reading or optical recognition in the resting state of the items 3, here also a stopping device 29 is provided which is, e.g., formed by a solenoid 30 having a plunger core 31 which extends to between two neighboring small rollers 27a following the sensing devices 10. The solenoid 30 is excited for a short time, e.g., by the signal of a photoelectric barrier (not illustrated), so that the passage of the items 3 is only slightly delayed.

Instead of chutes 7, 7', also two conveyor belts (not illustrated) may be arranged consecutively, a sufficiently wide gap being left clear at the site of transition between the two conveyor belts so as to allow for an optical scanning of the items through this gap.

Figure 5:
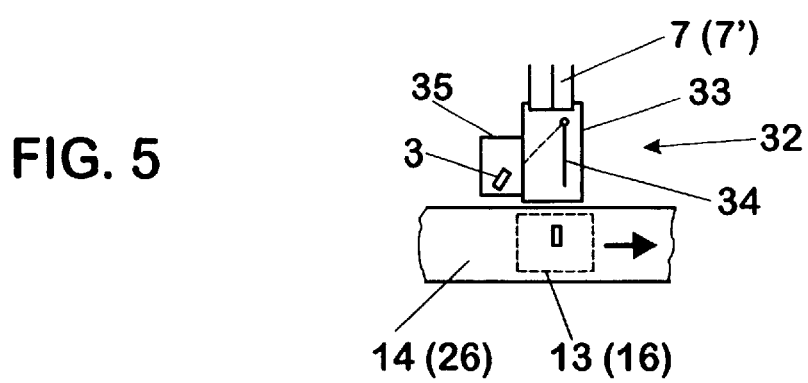
FIG. 5 shows a schematic top view onto an example of a device for automatically removing items arranged to follow the checking station.
Figure 6:
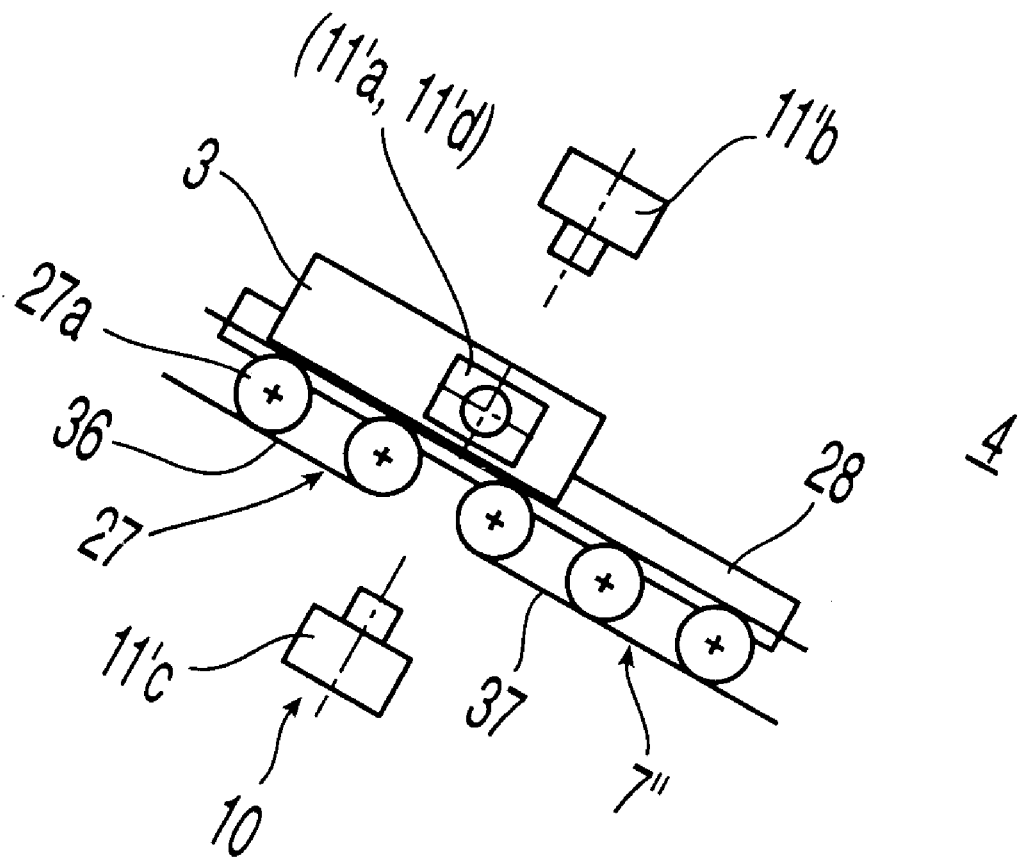
FIG. 6 is a side view of an embodiment of the chute utilizing space conveyors.

In the two exemplary embodiments according to FIGS. 1 and 2, also a device 32 illustrated in FIG. 5 for outwardly transferring those individual items 3 which have given rise to a negative checking result may be arranged downstream of the checking station 4 or of the chute 7, 7', respectively. This device 32 is, e.g., a chute 33 following upon the chute 7, 7', and provided with a pivot arm 34 to be actuated electrically via the computer or pneumatically, which pivot arm laterally detours the items 3 found to be incorrect, towards the edge of the chute 33 so that they then will drop into a container 35 provided there. Instead of the pivot arm 34, also a drop flap (not illustrated) may be provided.

Items 3 which have given rise to a positive checking result, on the other hand reach their conveyor path either directly via chute 33, or they get into a container 13 or 16, respectively, on the conveyor path 14 or 26′, respectively, so as to be directed towards the delivery or packing station, respectively.

What is claimed is:

1. A conveyor system for transporting items along a path and at least two optical reading devices for checking items with respect to product type and number disposed in a plane transverse to said path on opposite sides of the conveyor system wherein said conveyor system has a portion aligned with said reading devices permitting passage of light therethrough to check the bar code, a mark, an inscript, a figure on the items and/or the contour of the items.

2. A conveyor system as set forth in claim 1 further comprising a container-emptying station followed by an aligning and individualizing station prior to the portion aligned with said reading devices.

3. A conveyor system as set forth in claim 2 wherein the aligning and individualizing station is comprised of a plurality of laterally offset conveyor belts for conveying the items at different speeds.

4. A conveyor system as set forth in claim 3 wherein the conveyor belts with the exception of a last conveyor belt are provided with directing plates for directing items to the next conveyor belt.

5. A conveyor system as set forth in claim 3 wherein the conveying speeds increase from each conveyor belt to a subsequent conveyor belt.

6. A conveyor system as set forth in claim 1 wherein the portion of the conveyor system aligned with said reading devices is comprised of a partially transparent chute having a v-shaped cross section.

7. A conveyor system as set forth in claim 6 wherein the partially transparent chute is comprised of legs which enclose an angle of 90° with each other.

8. A conveyor system as set forth in claim 1 wherein said reading devices are followed by a device for automatically transferring the items outwardly.

9. A conveyor system as set forth in claim 1 wherein said at least two optical reading devices are arranged opposite each other.

10. A conveyor system as set forth in claim 9 wherein four optical reading devices are provided and arranged opposite each other in pairs.

11. A conveyor system as set forth in claim 1 further comprising a stopping device for stopping the items, wherein the stopping device is arranged in the region of the optical reading devices.

12. A conveyor system as set forth in claim 11 wherein the stopping device is comprised of a solenoid.

* * * * *